(12) United States Patent
Coers et al.

(10) Patent No.: US 7,992,372 B1
(45) Date of Patent: Aug. 9, 2011

(54) DRAPER PLATFORM WITH BREAKAWAY JOINT

(75) Inventors: Bruce A Coers, Hillsdale, IL (US); Andrew J Foerderer, Bettendorf, IA (US); James K Adamson, Colona, IA (US); Mark L Pearson, Le Claire, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/883,460

(22) Filed: Sep. 16, 2010

(51) Int. Cl.
*A01D 43/00* (2006.01)
(52) U.S. Cl. ........................................ 56/153
(58) Field of Classification Search .......... 56/153, 56/192, 228, 15.8
See application file for complete search history.

(56) References Cited

U.S. PATENT DOCUMENTS

| | | | | |
|---|---|---|---|---|
| 3,214,002 | A * | 10/1965 | Kirkpatrick et al. | 198/369.7 |
| 3,683,601 | A * | 8/1972 | Van der Lely | 56/6 |
| 3,714,766 | A * | 2/1973 | Ender et al. | 56/364 |
| 3,897,832 | A * | 8/1975 | Leedahl et al. | 172/311 |
| 4,184,314 | A * | 1/1980 | Hobbs | 56/372 |
| 4,232,747 | A * | 11/1980 | Pfenninger et al. | 172/311 |
| 4,409,780 | A * | 10/1983 | Beougher et al. | 56/228 |
| 5,111,636 | A * | 5/1992 | Quirin | 56/367 |
| 5,540,290 | A * | 7/1996 | Peterson et al. | 172/311 |
| 5,724,798 | A * | 3/1998 | Stefl et al. | 56/119 |
| 5,845,472 | A * | 12/1998 | Arnold | 56/94 |
| 6,205,757 | B1 * | 3/2001 | Dow et al. | 56/366 |
| 6,598,381 | B2 * | 7/2003 | Albinger et al. | 56/15.2 |
| 7,360,351 | B2 * | 4/2008 | Rickert et al. | 56/228 |
| 7,827,774 | B2 * | 11/2010 | Dow et al. | 56/192 |
| 2002/0017090 | A1 * | 2/2002 | Hockenbeck | 56/16.2 |
| 2004/0123575 | A1 * | 7/2004 | Rickert | 56/14.7 |
| 2008/0072560 | A1 * | 3/2008 | Talbot | 56/208 |
| 2008/0295473 | A1 * | 12/2008 | Tippery et al. | 56/14.5 |

FOREIGN PATENT DOCUMENTS

DE 102006022480 A1 * 11/2007

* cited by examiner

*Primary Examiner* — Árpád Fábián-Kovács

(57) ABSTRACT

A draper platform (100) for mounting on the feederhouse of an agricultural combine, comprises a center frame section (104) configured to be supported on the feederhouse and supporting a first endless conveyor belt (132, 126); a wing frame section (102, 106) configured to be supported on a first side of the center frame section (104) and having a second endless conveyor belt (124, 130); and a first pivot joint (110, 114) coupling the center frame section (104) to the wing frame section (102, 106), the first pivot joint (110, 114) constraining the wing frame section (102, 106) to pivot with respect to the center frame section (104) about a generally horizontal and forwardly extending axis (108, 112), the first pivot joint comprising first, second, and third pivot couplings (308, 310, 334), wherein the first pivot coupling is a breakaway coupling and is disposed forward of the second pivot coupling (310) and the third pivot coupling (334).

9 Claims, 5 Drawing Sheets

DRAPER PLATFORM WITH BREAKAWAY JOINT

FIELD OF THE INVENTION

The present invention relates to agricultural combine harvesting machinery, and more particularly to draper platforms. Even more particularly it refers to draper platforms having relatively pivoting frame sections with breakaway joints.

BACKGROUND OF THE INVENTION

Combines are large self-propelled vehicles used for harvesting and threshing agricultural crop in the field. A harvesting head is typically disposed across the front of the combine vehicle supported on a feederhouse. This harvesting head is configured to cut and convey the crop into the combine vehicle itself where it is threshed, separated, and cleaned.

Traditional harvesting heads included an elongate rigid frame to which harvesting implements are added such as cutter bars, augers, reels, and endless belt conveyors. More recently, the once rigid frame has been replaced by multiple frame sections that are coupled together to pivot with respect to each other.

A typical arrangement has a center frame and left and right wing frames that are coupled to the center frame to pivot with respect to the center frame. This arrangement requires that the other elements in the harvesting head also be pivotable with respect to each other. This multiple pivoting frame arrangement permits wider harvesting heads to more accurately follow the contours of the ground as they are harvesting and therefore to cut more crop.

One problem with larger harvesting heads with pivoting frames is their susceptibility to damage. The newer draper frames are longer than traditional frames. They are made lighter per unit length in order to limit their weight. As a result, if they hit obstructions in the field, they are more prone to damage, particularly at the pivot joints where the impact forces are highly concentrated.

This multiple frame arrangement is employed in harvesting heads that use endless belt conveyors to convey material. Such harvesting heads are commonly called "draper platforms". As the frame sections pivot with respect to each other the conveyor belts can change their tension or alignment and be damaged. The conveyor belts can also rub against other components.

Many devices exist to prevent damage to agricultural equipment driven through agricultural fields planting, harvesting or cultivating crops.

GB 2264619 shows a breakaway shank for a spade mounted on a rectangular toolbar. The upper end of the shank clamps to the toolbar. When an overload condition exists, a bolt breaks due to excessive tensile load and the clamp halves spread apart. This permits the spade to rotate rearwardly, away from the ground around the longitudinally extending toolbar. The spade rotates about a horizontal and laterally extending axis and may even fall off the rectangular toolbar. The toolbar does not breakaway. Instead, individual implements (the spade) mounted on the toolbar break away.

U.S. Pat. No. 5,957,216 shows an arrangement for a lightweight marker boom. It has a resettable breakaway coupling for a laterally extending boom that supports a disc marker for disc marking the field. The boom has a spring loaded detent that permits the boom, when hit with an obstruction, to pivot rearward about a generally vertical axis. The implement-carrying toolbar itself is not configured to break away, just the slender marker boom.

U.S. Pat. No. 4,829,957 shows another arrangement for a lightweight marker boom. It has a breakaway coupling for a lightweight boom supporting a row marker at the end of a planter.

In the above examples, the toolbar carrying the working implements does not break away. The implements do, or the lightweight marker boom does.

U.S. Pat. No. 6,675,668 shows a frame for a multi-section draper platform having three frame sections (five in FIG. 12). It requires an array of linkages and load-balancing elements that extend across the three sections. Pivot pins couple the wing frames to the center frame sections. No means for breaking the toolbar or frame of the draper platform is provided.

DE 102006022480 shows a forage harvester having a header with a center frame section, and with two wing frame sections that are foldable to a transport position. Unlike the above examples, the frame is hinged for transport. The hinge pin coupling the sections can be sheared under high loads permitting the wing frame sections to breakaway when the wings are in their extended operating position. When the hinge pin is sheared no means is described or illustrated to support the wing section and prevent it from falling on the ground and being dragged behind the vehicle.

None of the examples above solve the problem of a draper platform with an implement-carrying frame that can yield to impact, yet is strong enough to support the yielded draper section together with its many components.

This problem is solved by the arrangement described in claim 1. Further advantages are provided by additional claims dependent upon claim 1.

SUMMARY OF THE INVENTION

In accordance with a first aspect of the invention, a draper platform for mounting on the feederhouse of an agricultural combine, is provided, comprising a center frame section configured to be supported on the feederhouse and supporting a first endless conveyor belt; a wing frame section configured to be supported on a first side of the center frame section and having a second endless conveyor belt; a first pivot joint coupling the center frame section to the wing frame section, the first pivot joint constraining the wing frame section to pivot with respect to the center frame section about a generally horizontal and forwardly extending axis, the first pivot joint comprising first, second, and third pivot couplings, wherein the first pivot coupling is a break-away coupling and is disposed forward of the second pivot coupling and the third pivot coupling.

The second pivot coupling and the third pivot coupling may constrain the wing frame section to pivot rearward through a first angle with respect to the center frame section about a generally vertical axis when pivot coupling breaks away. The first angle may be at least 30 degrees, 50 degrees, or 90 degrees. The first, second and third pivot couplings may be disposed behind the first and second endless conveyor belts. The second pivot coupling may comprise one of a universal joint, a spherical bearing and a swivel. The first pivot coupling may be a hinge joint having a replaceable pivot pin configured to shear upon the application of a predetermined shearing load. The predetermined shearing load may be selected such that it is insufficient to break the second pivot coupling and the third pivot coupling

DETAILED DESCRIPTION OF THE PREFERRED EMBODIMENT

The terms "front", "in front of", "forward", "fore-and-aft", "rear", "behind", "rearward" and like terms as used herein are made in reference to "V" (FIG. 1), which is the direction of travel through the field during normal, straight-line, harvesting operations. The direction of travel is horizontal and perpendicular to the longitudinal extent of the draper platform. The terms "transverse", "side-to-side" and the like refer to a direction generally parallel to the longitudinal extent of the draper which is horizontal and transverse to the direction of travel "V" of the draper platform.

Below, the application describes the construction and operation of structures on the left side of the draper platform. The construction and operation of the right side of the draper platform is identical to the construction and operation of the left side of the draper platform in every respect, but is constructed as a mirror image of the left side.

Figure 1:
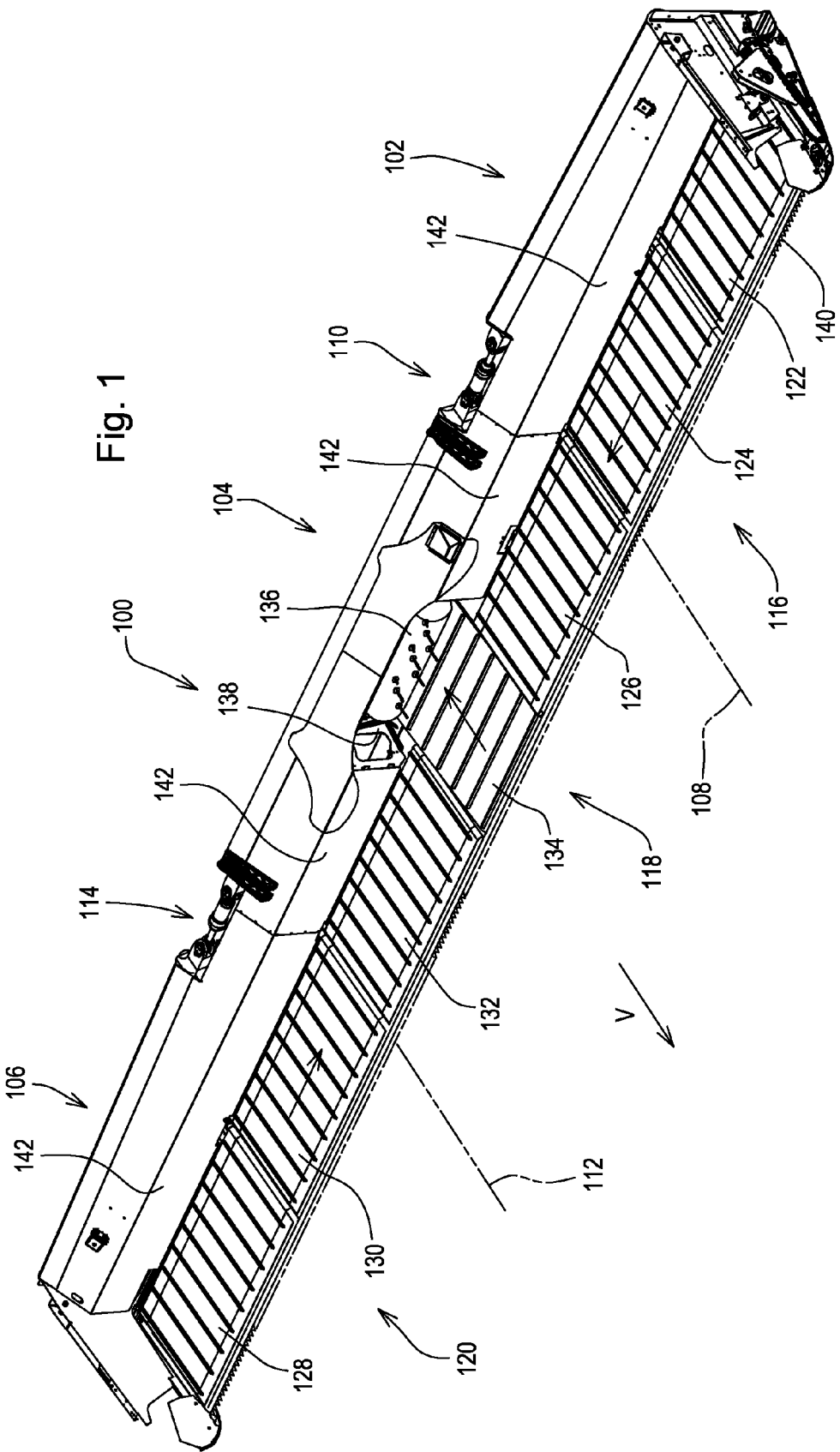
FIG. 1 is a perspective view of a draper platform in accordance with the present invention.

In FIG. 1, a draper platform 100 is comprised of a left frame section 102, a center frame section 104, and a right frame section 106. Left frame section 102 pivots about a generally horizontal and forwardly extending axis 108 with respect to center frame section 104. This axis is defined by pivot joint 110. Pivot joint 110 couples left frame section 102 and center frame section 104 together and constrains them to pivot about axis 108. Right frame section 106 pivots about a generally horizontal and forwardly extending axis 112 with respect to center frame section 104. This axis is defined by pivot joint 114. Pivot joint 114 couples right frame section 106 and center frame section 104 together and constrains them to pivot about axis 112.

Draper platform 100 further comprises a left side endless belt conveyor 116, a center endless belt conveyor 118, and a right side endless belt conveyor 120. Left side endless belt conveyor 116 is comprised of three separate endless conveyor belts 122, 124, 126. Right side endless belt conveyor 120 is comprised of three separate endless conveyor belts 128, 130, 132. Belts 122, 124, 126, 128, 130, 132 have upper surfaces that are coplanar and are driven by motors (not shown) to carry cut crop material laterally inwardly in the direction indicated by the arrows superimposed on the conveyors toward the center portion of draper platform 100, where they deposit their cut crop material onto endless conveyor belt 134 of center endless belt conveyor 118. Endless conveyor belt 134 is driven by a motor (not shown) to carry cut crop material rearwardly in the direction indicated by the arrows superimposed on endless conveyor belt 134. Endless conveyor belt 134 carries the cut crop material underneath guide roller 136. Guide roller 136, in turn, carries the cut crop material rearward through central aperture 138 disposed in the rear wall of draper platform 100. Cut crop material passing through central aperture 138 is received in a feederhouse (not shown) of an agricultural combine (also not shown) in the conventional manner.

A reciprocating knife assembly 140 is disposed along the leading edge of the draper platform 100, extending substantially the entire width of the draper platform. The reciprocating knife assembly 140 is configured to sever crop plants near their roots, permitting the upper portion of the crop plant to fall on the left side endless belt conveyor 116, center endless belt conveyor 118 and right side endless belt conveyor 120. A reel (not shown) is disposed above the reciprocating knife assembly 140 and is configured to engage the tops of the crop plants, gently pushing them rearward such that they fall onto conveyors 116, 118, 120.

Back sheets 142 extend generally vertically from the rear edge of conveyor belts 122, 124, 126, 128, 130, 132. These back sheets serve as a backstop or barrier to prevent cut crop material from passing completely across draper platform 100 and falling on the ground.

Figure 2:
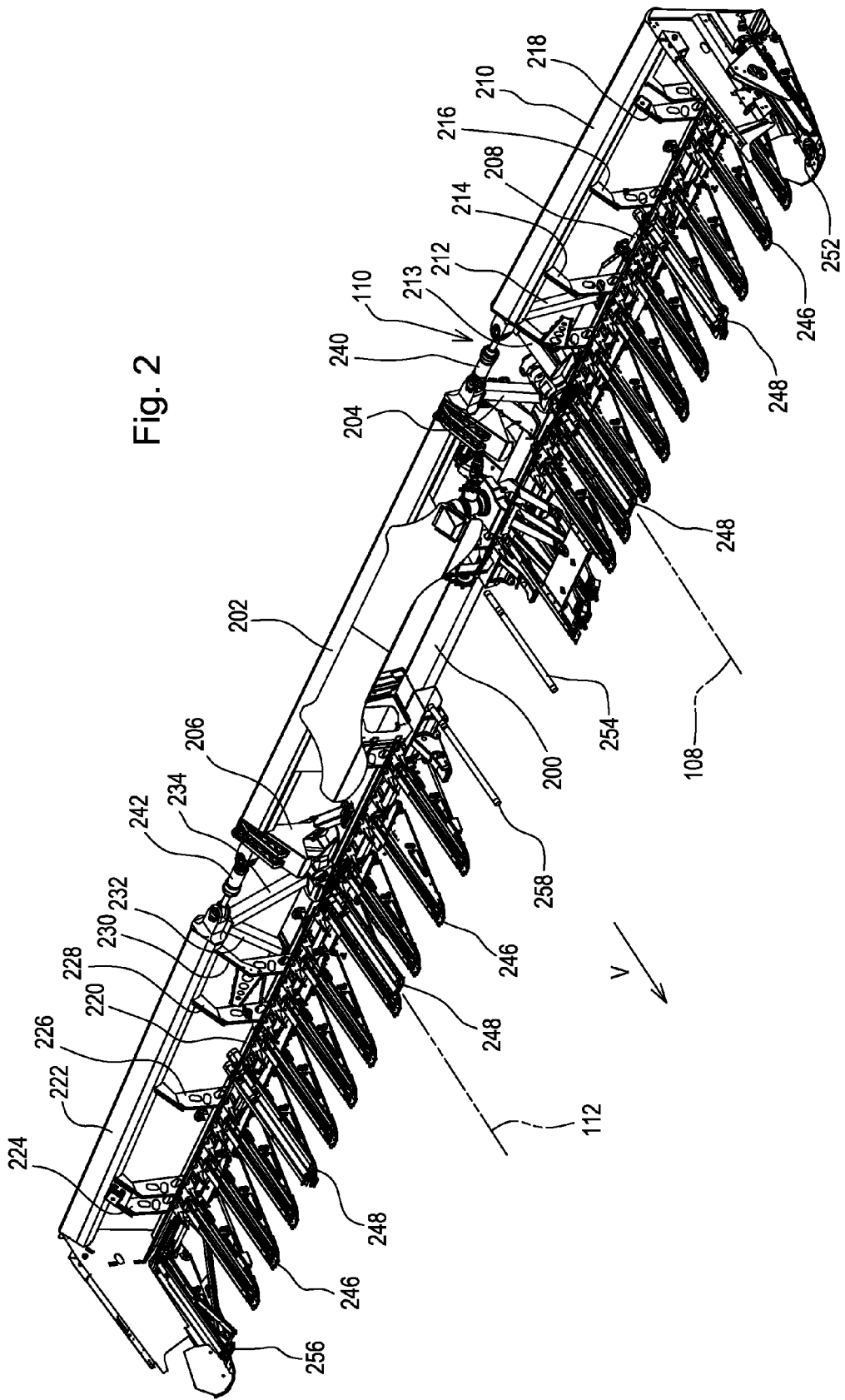
FIG. 2 is a perspective view of the draper platform of FIG. 1 with the conveyor belts and back sheets removed.

Referring now to FIG. 2, back sheets 142 have been removed, as have endless conveyor belts 122, 124, 126, 128, 130, 132, 134 and reciprocating knife assembly 140.

The frame of center frame section 104 comprises a horizontal and laterally extending beam 200 that is coupled to a horizontally and laterally extending beam 202. Beam 202 is parallel to and disposed above beam 200. Cross members 204, 206 couple beams 200, 202 together to provide a rectangular framework.

In a similar fashion, the frame of left frame section 102 is comprised of a horizontally and laterally extending beam 208 that is coupled to a horizontally and laterally extending beam 210. Beam 210 is parallel to and disposed above beam 208. Cross members 212, 214, 216, and 218 extend between and couple beams 208, 210 together to form the frame of left frame section 102.

In a similar fashion, the frame of right frame section 106 is comprised of a horizontally and laterally extending beam 220 that is coupled to a horizontally and laterally extending beam 222. Beam 222 is parallel to and disposed above beam 220. Cross members 224, 226, 228, 230, 232, and 234 extend between and couple beams 222, 220 together to form the frame of right frame section 106.

The left end of beam 200, and the right end of beam 208 are coupled together by a pivot joint 110. Pivot joint 110 couples together lower adjacent portions of left frame section 102 and center frame section 104.

The right end of beam 200 and the left end of beam 220 are coupled together by a pivot joint 114. Pivot joint 114 couples together lower adjacent portions of right frame section 106 and center frame section 104.

The left end of beam 202 and the right end of beam 210 are coupled together by an elongate member 240. Elongate member 240 couples together upper adjacent portions of left frame section 102 and center frame section 104.

The right end of beam 202 and the left end of beam 222 are coupled together by an elongate member 242. Elongate member 242 couples together upper adjacent portions of right frame section 106 and center frame section 104

A plurality of conveyor support arms 246 are pivotally coupled to beams 200, 208, and 220 at their rear ends such that they can pivot up and down at their forward ends as the draper platform 100 travels through the agricultural field harvesting crops. Beams 200, 208, 220 extend substantially horizontally and perpendicularly to the direction of travel "V". Conveyor support arms 246 are fixed to the reciprocating knife 140 (FIG. 1) at their forward ends. Reciprocating knife 140 is designed flexible enough that individual support arms 246 can move up and down with respect to adjacent support arms 246 as they follow the terrain of the agricultural field, and the reciprocating knife 140 can flex between these adjacent arms to permit this relative movement.

Support arms 246 are all disposed generally horizontally and at the same slightly forwardly and downwardly sloping angle on the draper platform 100 rests upon flat ground. Support arms 246 are spaced parallel to each other a constant distance apart (with the exception of the region where the endless conveyor belt 134 for the center conveyor is located).

The upper surface 250 of support arms 246 is generally narrow and elongated and is disposed beneath each conveyor belt. A wide gap is provided between each adjacent support arm such that four support arms are disposed below each conveyor belt leaving a cumulative gap of three to five times the width of each support arm between the ends of each conveyor belt. A wear strip or other anti-friction coating is preferably applied to the top surface of each support arm to prevent the support arm from wearing when it is thrust upward and into contact with the conveyor belt running across it. As each support arm engages the ground at its forward end, the support arm is flexed upward lifting the support arm together with the portion of the reciprocating knife that is fixed to the forward end of the arm. An elongate slot is formed underneath the upper surface 250 to support the conveyor belt as it follows its unloaded return path back to the outer roller about which it is wrapped. This arrangement provides a draper platform with a flexible reciprocating knife that can move up and down on support arms to follow the terrain of the field, lifting and lowering the conveyor belts as the support arms themselves are lifted and lowered by the terrain.

Two pairs of drive rollers 248 are disposed on the left side and right side of the draper platform 100. These drive rollers are disposed between adjacent support arms 246. Pairs of drive rollers 248 support and drive the end portions of the conveyor belts. The conveyor belts reverse their direction of travel at each drive roller. The outermost endless conveyor belt 122 (FIG. 1) of the left side conveyor wraps around and is supported on a outermost roller 252. The innermost endless conveyor belt 126 of the left side conveyor wraps around and is supported on an innermost roller 254. The outermost endless conveyor belt 128 of the right side conveyor wraps around and is supported on an outermost roller 256. The innermost endless conveyor belt 132 of the right side conveyor wraps around and is supported on an innermost roller 258.

The two pairs of drive rollers 248 includes a driven outer roller 249 (roller 249 supports outer end of conveyor belts 124, 126, 132, 130) and an inner drive roller 251 (roller 251 supports the inner end of conveyor belts 124, 126, 132, 130).

This conveyor belt arrangement permits the three conveyor belts on each side to be disposed next to each other to create it a continuous upper surface (except for the narrow gaps between the immediately adjacent drive rollers in each pair of drive rollers 248) that extends from the left-sided right side outer ends of the draper platform 100 to the center conveyor. By mounting the conveyors on support arms 246 that are pivotally coupled to the lower portions of the three frame sections (i.e. to beams 208, 200, 220) the arms can float up and down.

The draper platform is permitted to flex during operation in a second manner as well: each of the three frame sections can pivot up and down with respect to each other about axes 108, and 112. Elongate members 240, 242 include a spring—in this case a hydraulic cylinder coupled to an accumulator that together function as a hydraulic spring. As the draper platform 100 travels over undulating terrain, the force on the bottom of the forward ends of support arms 246 varies. If the draper platform 100 dips into a shallow depression, for example, a large force may be applied to the ends of the draper platform. This large force on the ends will pivot the support arms 246 upward at the ends of the draper platform. It will also tend to lift the left and right sections of the draper platform upward at their ends. If the force is sufficient, it will cause the left section of the draper platform 100 to pivot upwards about axis 108, and will cause the right section of the draper platform 100 to pivot upwards about axis 112. Both the pivoting of support arms 246 in the pivoting of the left and right sections of the draper platform work together to permit the draper platform to accommodate terrain with greater fluctuations than previous designs.

To ensure better contact with the ground, the inner end of endless conveyor belt 124 and the outer end of endless conveyor belt 126 on the left side of the draper platform 100 terminate at pivot axis 108. Likewise, the inner end of the endless conveyor belt 130 and the outer end of endless conveyor belt 132 terminate at pivot axis 112. Pivot axes 108 and 112 are disposed parallel to and between adjacent drive rollers in pairs of drive rollers 248. Pivot axes 108 and 112 are disposed parallel to the upper working surface of endless belt conveyors 116, 118, and 120.

Figure 3:
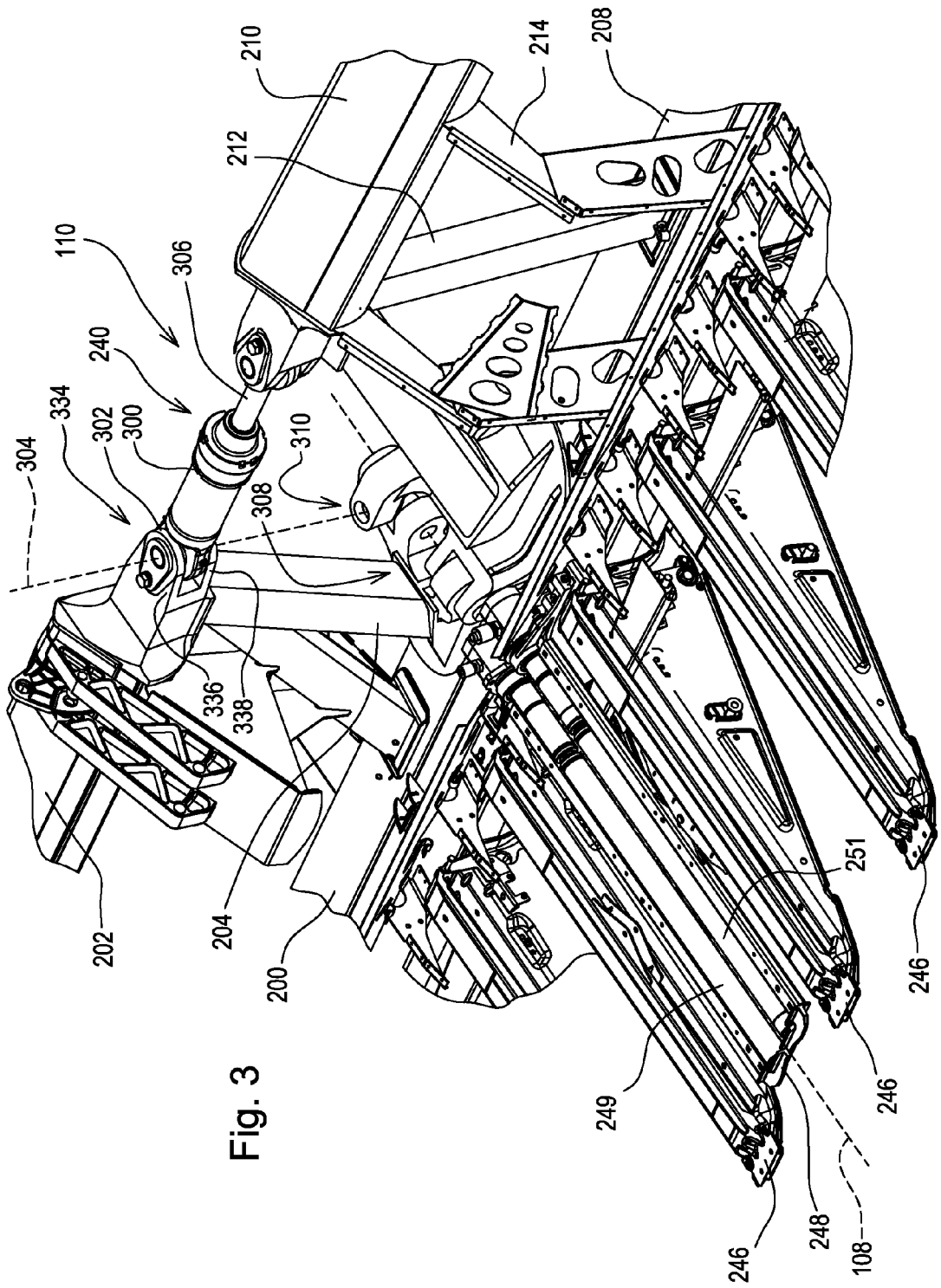
FIG. 3 is a fragmentary detail perspective view of the draper platform of FIGS. 1-2 taken at the pivot joint between the center platform section and the left wing platform section.
Figure 4:
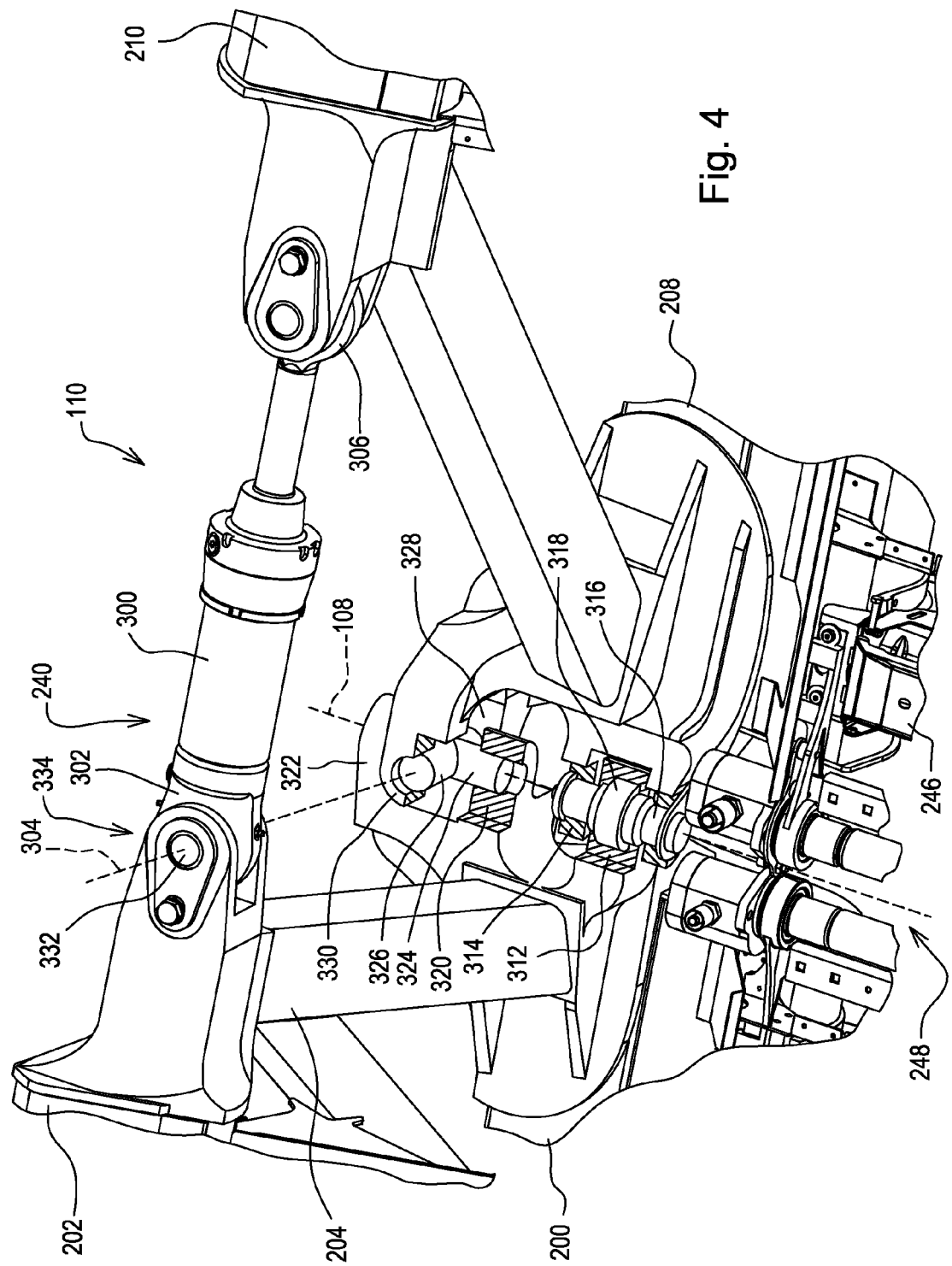
FIG. 4 is a fragmentary detail perspective view of the draper platform of FIGS. 1-3 taken at the pivot joint between the center platform section and the left wing platform section, cut away to illustrate the arrangement of the pivot joint.

Referring now to FIG. 3, additional details of pivot joint 110 can be seen. Elongate member 240 includes a hydraulic cylinder 300 with the cylinder end 302 pinned to the end of beam 202. This joint constrains the elongate member 240 to pivot with respect to beam 202 about pivot axis 304. Alternatively the joint coupling the cylinder end of the cylinder 300 to beam 202 can include a spherical bearing in addition to the pin.

The rod end 306 of hydraulic cylinder 300 is pinned to beam 210. Alternatively, the joint that couples the rod end 306 of cylinder 300 to beam 210 can include a spherical bearing in addition to or as an alternative to the pin.

In normal operation, hydraulic cylinder 300 is coupled to an accumulator that tensions the cylinder 300, and pulls inwardly on rod end 306. The lower portion of pivot joint 110 includes two pivot couplings 308, and 310. Pivot coupling 308 is disposed forward of pivot coupling 310. Pivot coupling 308 is in the form of a hinge having a hinge knuckle 312 fixed to the end of beam 200, two hinge knuckles 314, 316 fixed to the end of beam 208, and a hinge pin 318 extending therethrough. Pivot coupling 310 is disposed to the rear of pivot coupling 308 and is in the form of two hinges spaced closely together or a universal joint. Pivot coupling 310 includes two hinge knuckles 320, 322 extending from the end of beam 200 and a pin 324 supported in knuckles 320, 322 to pivot about axis 108. Pin 324 is formed integral with another pin 326 that is disposed at an angle (preferably 90 degrees, as shown here) with respect to pin 324 that is supported in hinge knuckles 328, 330 that are fixed to the end of beam 208. Pin 324 is aligned coaxial with pin 318, thus constraining beam 208 to pivot up and down with respect to beam 200 about axis 108. In an alternative arrangement either or both of pivot couplings can be spherical couplings in which the centers of the spherical couplings are disposed on axis 108. This would perform the same function of constraining the movement of beam 200 with respect to beam 208 to be about axis 108.

Pin 326 is aligned coaxially with the pin 332 of pivot coupling 334. Pivot coupling 334 couples elongate member 240 with respect to beam 202. Pivot coupling 334 is in the form of a hinge in which hinge knuckles 336, 338 are fixed to and extend outward from beam 202, and the eye 302 of cylinder 300 functions as the other hinge knuckle. Alternatively, pivot coupling 334 can be a spherical coupling, swivel coupling or a ball joint. Pin 326 and pin 332 are coaxially aligned with each other to constrain left frame section 102 to pivot about pivot axis 304 with respect to center frame section 104 under certain conditions that are described below.

During normal operation, as draper platform 100 is pushed over the ground, the undulating terrain applies upward forces to the underside of the platform and causes the support arms 246 to pivot up and down.

If the terrain increases significantly in height, the ground forces acting upward on support arms 246 will not only pivot support arms 246 upward, but they will also lift left frame section 102 with respect to center frame section 104. This causes left frame section 102 to pivot upward at its outer end about pivot axis 108.

If the agricultural harvester on which the draper platform 100 is mounted left frame section 102 is pushed into an obstruction such as a tree trunk, a bending force will be applied to the left frame section 102 tending to pull it rearward. This force is resisted by an opposing moment generated by pins 318 and 324.

If the bending force is too great, pin 318 breaks, thereby permitting the left frame section 102 to pivot to the rear relative to the center frame section 104 and about pivot axis 304. Pivot pin 318 is designed to break at a threshold load that is below the load at which the draper platform is damaged. Even when pin 318 has been sheared due to the excessive force, the left frame section 102 is still supported by the center frame section such that it does not drag on the ground or dangle at an unknown or odd angle that prevents it from being reattached or from being easily taken out of the field for repairs.

The pivot axis 304 extends generally vertically, preferably slightly forward of vertical, and preferably at 90 degrees with respect to pivot axis 108 as illustrated herein. When pin 318 is sheared under excessive load, angle of pivot axis 304 constrains the left frame section 102 to pivot simultaneously upward and to the rear of center frame section 104 until the obstruction has been passed and no longer engages the left frame section 102. Once the left frame section 102 has cleared the obstruction, the left frame section—now elevated and swung to the rear and extending (worst case) at 90 degrees with respect to the center frame section 104—pivots forward again under gravity by its own weight to its normal operating position, which is shown in the figures herein. At this point the hinge knuckles 312, 314, and 316 are coaxially aligned (or nearly so) and the draper platform can be repaired by inserting a replacement pin 318 through the steering knuckles 312, 314, 316.

This automatic swinging rearward, and then forward back into its original position advantageously restores the side-to-side and fore-and-aft weight distribution of the draper platform and the agricultural combine upon which it is mounted. Even when the pin 318 is sheared, the entire weight of the draper platform (including left frame section 102) is supported on the feederhouse of the agricultural combine. This permits the entire draper platform to be lifted into the air by the normal means of lifting the feederhouse on the agricultural combine and permits the easy transport of the draper platform back to the repair shop for further repair without additional delay.

By insuring that left frame section 102 pivots rearward about a generally vertical axis (slightly upward and away from the ground in this case), the frame is supported above the ground as it is pushed backward by the obstruction that sheared pin 318. It does not fall to the ground when pin 318 shears. Therefore it is not bent and damaged after pin 318 is sheared by being dragged along, partially embedded in the ground.

Figure 5:
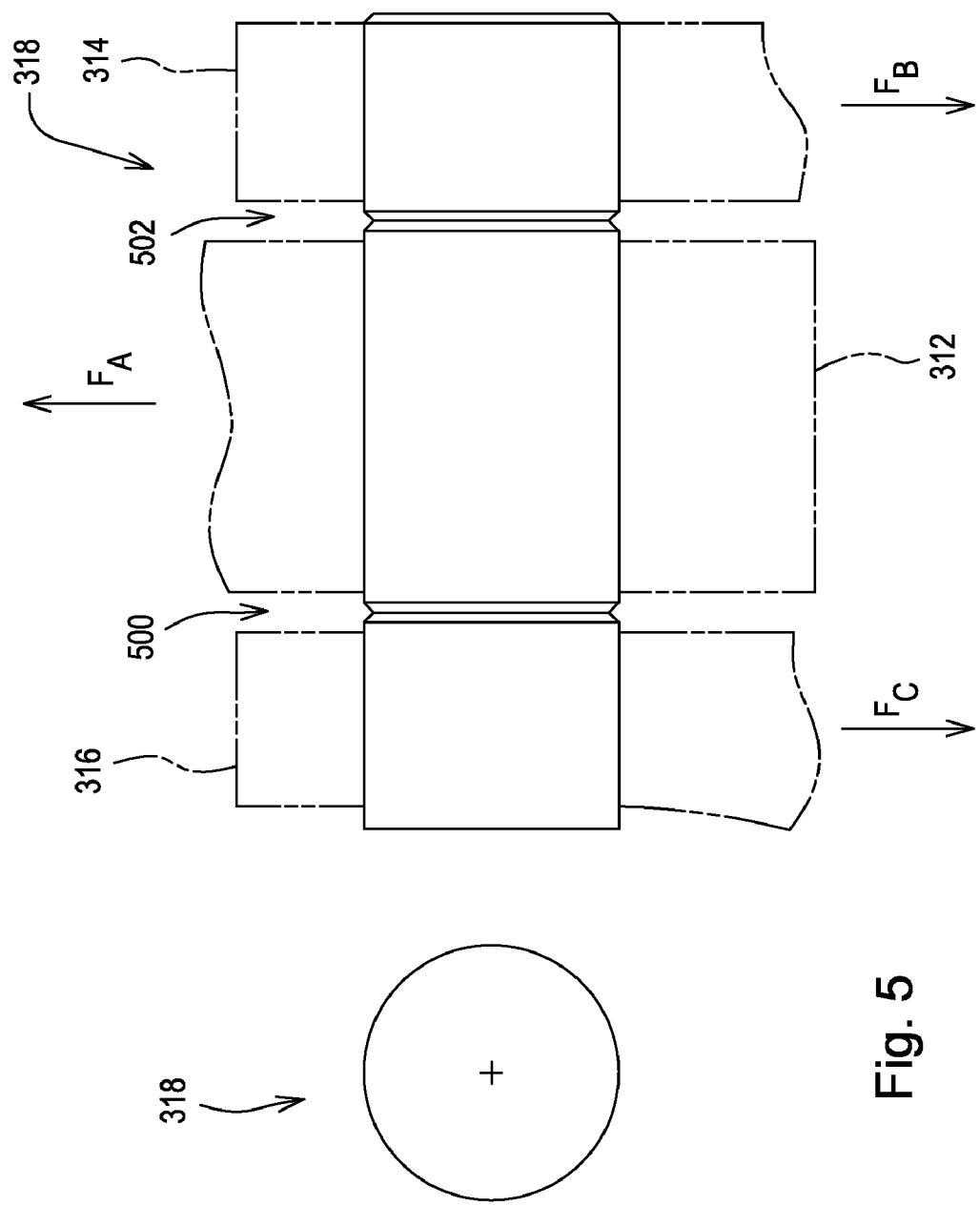
FIG. 5 is a side view of the front pivot pin showing its shearing relief features.

FIG. 5 illustrates hinge pin 318. Hinge pin 318 has an elongate right circular cylindrical body with two circumferential notches 500, 502 that are formed in the outer surface of the body. The notches are located in the gap between hinge knuckles 314 and 312 and between hinge knuckles 312 and 316. Forces Fa, Fb, and Fc are applied to the hinge knuckles when the left frame section 102 hits an obstruction. If forces Fa, Fb, Fc exceed a predetermined load (which is preferably below the threshold at which left frame section 102 suffers permanent frame damage) pin 318 is sized to shear at notches 500, 502. At which shearing hinge knuckles 314, 316 swing to the left and away from hinge knuckle 312. The left frame section 102 pivots about axis 304 and the left frame section 102 swings freely to the rear suspended from pivot coupling 334 and pivot coupling 310.

The left and right frame sections 102, 106 are supported on center frame section 104 at three points: pivot coupling 308, pivot coupling 310 and pivot coupling 334. By extending and contracting, elongate member 240 can change the relative pivotal positions of left frame sections 102 and center frame section 104 about axis 108.

At any given position, however, pivot couplings 308, 310, and 334 are oriented in a triangular array with respect to each other, lying in a plane that extends generally vertically and fore and aft. The three pivot couplings 308, 310, 334 will hold the left frame section 102 and the center frame section 104 fixed with respect to each other as though they were a single elongate member when elongate member 240 is prevented from extending and contracting.

The rearmost pivot couplings 310 and 334 are oriented generally vertically with respect to each other and far enough toward the rear of the draper header frame such that the left frame section 102 can pivot rearwardly (when pivot pin 318 is sheared) with respect to center frame section 104 at least 30 degrees about axis 304, more preferably at least 50 degrees and most preferably at least 90 degrees with respect to center frame section 104 while still supporting left frame section 102 elevated above the ground.

What is claimed is:

1. A draper platform (100) for mounting on the feederhouse of an agricultural combine, comprising:
   a center frame section (104) configured to be supported on the feederhouse and supporting a first endless conveyor belt (132, 126);
   a wing frame section (102, 106) configured to be supported on a first side of the center frame section (104) and having a second endless conveyor belt (124, 130); and
   a first pivot joint (110, 114) coupling the center frame section (104) to the wing frame section (102, 106), wherein the first pivot joint (110, 114) constrains the wing frame section (102, 106) to pivot with respect to the center frame section (104) about a generally horizontal and forwardly extending axis (108, 112), the first pivot joint comprising first, second, and third pivot couplings (308, 310, 334), wherein the first pivot coupling is a break-away coupling including a pivot pin (318) separate from said second and third pivot couplings, with the first pivot coupling being disposed forward of the second pivot coupling (310) and the third pivot coupling (334).

2. The draper platform (100) of claim 1 wherein the second pivot coupling comprises one of a universal joint, a spherical bearing and a swivel.

3. The draper platform (100) of claim 1, wherein the first pivot coupling (308) is a hinge disposed to pivot about a generally horizontal and fore-and-aft extending axis and comprising said pivot pin (318) disposed coaxial with the fore-and-aft extending axis and being configured to shear upon the application of a predetermined load, which is less than a load required to shear the second and third pivot couplings.

4. The draper platform (100) of claim 3, wherein the pivot pin (318) defines a circumferential notch (500, 502) configured to shear upon the application of said predetermined load.

5. A draper platform (100) for mounting on the feederhouse of an agricultural combine, comprising:
   a center frame section (104) configured to be supported on the feederhouse and supporting a first endless conveyor belt (132, 126);
   a wing frame section (102, 106) configured to be supported on a first side of the center frame section (104) and having a second endless conveyor belt (124, 130); and
   a first pivot joint (110, 114) coupling the center frame section (104) to the wing frame section (102, 106), wherein the first pivot joint (110, 114) constrains the wing frame section (102, 106) to pivot with respect to the center frame section (104) about a generally horizontal and forwardly extending axis (108, 112), the first pivot joint comprising first, second, and third pivot couplings (308, 310, 334), wherein the first pivot coupling is a break-away coupling and is disposed forward of the second pivot coupling (310) and the third pivot coupling (334), and wherein the second pivot coupling (310) and the third pivot coupling (334) constrain the wing frame section to pivot rearward through a first angle with respect to the center frame section (104) about a generally vertical axis (304) when pivot coupling 308 breaks away.

6. The draper platform (100) of claim 5, wherein the first angle is at least 30 degrees.

7. The draper platform (100) of claim 5, wherein the first angle is at least 50 degrees.

8. The draper platform (100) of claim 5, wherein the first angle is at least 90 degrees.

9. The draper platform (100) of claim 5, wherein the first, second and third pivot couplings (308, 310, 334) are disposed behind the first and second endless conveyor belts (122, 124, 126, 128, 130, 132).

* * * * *